United States Patent [19]

Graves et al.

[11] Patent Number: 4,762,870
[45] Date of Patent: Aug. 9, 1988

[54] RUBBER COMPOSITIONS MODIFIED WITH HYDROXY-BENZ-IMIDAZOLE OXIDES

[75] Inventors: Daniel F. Graves, Clinton, Ohio; Hans-Wilhelm Engels, Kerpen, Fed. Rep. of Germany

[73] Assignee: The Firestone Tire & Rubber Company, Akron, Ohio

[21] Appl. No.: 37,485

[22] Filed: Apr. 13, 1987

[51] Int. Cl.$^4$ .............................................. C08K 5/34
[52] U.S. Cl. ...................................... 524/93; 524/92; 525/347
[58] Field of Search ...................... 524/93, 92; 525/347

[56] References Cited

U.S. PATENT DOCUMENTS

| | | | |
|---|---|---|---|
| 2,367,827 | 1/1945 | Smith | 260/788 |
| 3,247,160 | 4/1966 | Anderson | 524/93 |
| 4,315,849 | 2/1982 | Buxbaum et al. | 524/93 |

OTHER PUBLICATIONS

J. Org. Chem., vol. 37, No. 15, 1972, pp. 2519-2520, 2372-2376.
A. Gasco et al., Advances in Heterocyclic Chemistry, vol. 29, pp. 310-311, Academic Press, 1981.
Houben Weyl, Methoden der Organischen Chemie, vol. X/III, p. 868.

Primary Examiner—Joseph L. Schofer
Assistant Examiner—Peter D. Mulcahy
Attorney, Agent, or Firm—Renner, Otto, Boisselle & Sklar

[57] ABSTRACT

It now has been found that the properties of rubber compositions comprising rubbers having an unsaturated carbon chain can be improved by including therein, a minor property-improving amount of at least one hydroxy-benzimidazole oxide compound of the formula

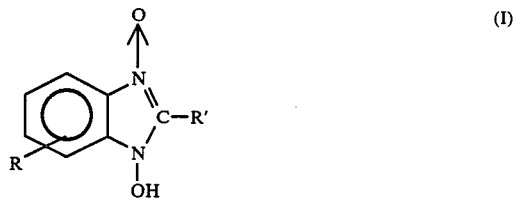

wherein R is hydrogen, or a halogen, hydroxyl, lower acyl, lower hydrocarbyl, lower hydrocarbyloxy, lower hydrocarbylthio, carboxyl, cyano, amino, amide or —C(O)— lower hydrocarbyl group, and R' is hydrogen, or a lower hydrocarbyl, lower hydrocarbyl amide, carboxamide carboxy acid, carboxy ester, or aryl group. When vulcanizates are prepared from such rubber compositions containing one or more fillers, the vulcanizates exhibit reduced low strain hysteresis and a high electrical resistivity.

In another aspect of the invention, a filled vulcanizate made by vulcanizing uncured compositions of the type described above and containing a filler, particularly carbon black, is improved in filler interaction, hysteresis, modulus, compression set and resiliency. Rubber articles and portions thereof such as tires, hoses, springs, belts, treads, sidewalls and the like can be made utilizing the improved filled vulcanizates of the invention.

28 Claims, No Drawings

RUBBER COMPOSITIONS MODIFIED WITH HYDROXY-BENZ-IMIDAZOLE OXIDES

TECHNICAL FIELD OF THE INVENTION

This invention relates to uncured rubber compositions, filled vulcanizates, and rubber articles such as tire, treads, sidewalls, hoses, belts, springs, etc. made therefrom. More particularly, it relates to rubber compositions exhibiting improved properties and containing one or more hydroxy-benzimidazole oxides. The invention also relates to articles made from such vulcanizates such as tires, and methods of reducing the rolling loss and running temperatures of such tires.

BACKGROUND OF THE INVENTION

It is known that rubber compositions generally are combined or "compounded" with various other materials before being cured and/or put into use. Some of these added materials through chemical and/or physical interaction with the rubber improve the properties of the end product in service while others improve processing properties of the uncured compositions. In some instances, both effects may be achieved. It is also known that the various chemicals, pigments and other materials so used, both organic and inorganic, can interact in various ways to produce desirable or deleterious effects. For further discussions of rubber processing and materials used therein, see, for example, *Encyclopedia of Polymer Science and Technology*, Second Edition, published by John Wiley and Sons, New York (1970), particularly Vol. 12, page 280 and *The Vanderbilt Rubber Handbook*, R. T. Vanderbilt Company, Norwalk, Conn., 06855 (1968), particularly Sections 6, 7, 8, 9 and 11.

Vulcanizing agents, plasticizers, extenders, accelerators, fillers, pigments, etc. generally are incorporated into vulcanizable rubber compositions so that the rubber can be cured or vulcanized in a mold to form useful articles. It often is necessary to include processing aids in rubber compounds prior to molding and curing. These aids are primarily intended to improve the mixing of the ingredients of the rubber compound, the processability of the rubber, the mold or mill release properties of the rubber, tack and green strength without seriously adversely affecting the properties of the cured rubber.

Vulcanizing or curing agents used in vulcanizable rubbers generally are sulfur or sulfur-containing compounds or peroxide compositions. The rate of the vulcanization reaction generally is slow with many rubber materials unless an accelerator is incorporated into the vulcanizable mixture. A number of materials have been suggested and utilized for their accelerating effect. Such materials include metal oxides, for example, lead oxide, calcium oxide and magnesium oxide. Organic accelerators have found wide use in today's technology, and many of these are derivatives of aniline. A large portion of the organic vulcanization accelerators which are in current use are derivatives of 2-mercaptobenzothiazole (MBT). One group of MBT derivatives which has found wide acceptance includes the N-derivatives of 2-benzothiazole sulfenamide. A number of such derivatives and their use as accelerators of vulcanization are described and discussed in Vol. 20 of the Encyclopedia of Chemical Technology, Kirk-Othmer editors, Third Edition, 1983, pp. 337–363. See also U.S. Pat. No. 2,367,827.

In order to minimize or eliminate premature curing of the rubber formulation (scorching), the vulcanizing agents and accelerators are added to the formulation just prior to the curing step. The other normally used rubber formulation additives are mixed with the base rubber compositions in, for example, a masterbatch operation, prior to contact with the sulfur and accelerator.

Fillers such as carbon blacks, glass, silica, talc, and other finely divided inorganic materials are used in rubber formulations and vary widely as to their characteristics and combinations of characteristics. In rubber formulations, carbon black and/or silica are used as reinforcing fillers. Many carbon blacks of the channel and furnace types with varying characteristics have been utilized because they impart varying desirable characteristics to the rubber. The formation of a secondary network structure in rubber stocks containing reinforcing carbon blacks leads to high hysteresis at low deformations. Various additives have been suggested in the art to reduce the hysteresis of such rubber stocks.

As mentioned, the present invention relates to tires having low rolling resistance. Since the tread portion of a tire is adapted to be ground contacting and occupies a considerable portion of the tire thereof, it is advantageous to use a tread composition which will produce a tread having desirable properties. Rubber compositions which will produce tires having a small hysteresis loss due to deformation of the tires when they are rolled have been used in the industry in attempts to obtain tires having decreased rolling resistance. Conventional tread compositions normally are composed of materials which tend to increase hysteresis loss in the resulting treads.

One of the difficulties of producing tire treads having decreased hysteresis loss is the potential resulting loss of other desirable properties such as braking performance wet and dry traction, and wear resistance. Thus, it is desirable to develop rubber formulations useful in making the treads of tires which reduce the hysteresis loss of the treads without impairing braking performance, traction, wear resistance and other desirable properties.

SUMMARY OF THE INVENTION

It now has been found that the properties of rubber compositions comprising rubbers having an unsaturated carbon chain can be improved by including therein, a minor property-improving amount of at least one 1-hydroxy-benzimidazole 3-oxide compound of the formula

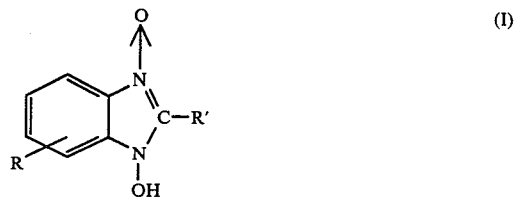

wherein R is hydrogen, or a halogen, hydroxyl, lower hydrocarbyl, lower hydrocarbyloxy, lower hydrocarbylthio, carboxyl, cyano, amino, amide or —C(O)— lower hydrocarbyl group, and R' is hydrogen, or a lower acyl, lower hydrocarbyl, lower hydrocarbyl amide, carboxamide carboxy acid, carboxy ester, or aryl group.

In another aspect of the invention, a filled vulcanizate made by vulcanizing uncured compositions of the type described above and containing a filler, particularly carbon black, is improved in filler interaction, hysteresis, modulus, compression set and resiliency. Rubber articles and portions thereof such as tires, hoses, belts, tread sidewalls and the like can be made utilizing the improved filled vulcanizates of the invention.

DETAILED DESCRIPTION OF THE INVENTION

The rubber compositions in one embodiment of this invention are not cured. In other words, they are not vulcanized. In one embodiment of the invention, the uncured rubber compositions of the present invention are modified rubber compositions which comprise (a) at least one rubber having an unsaturated carbon chain, and (b) a minor, cured property-improving amount of at least one 1-hydroxy-benzimidazole 3-oxide compound of the formula

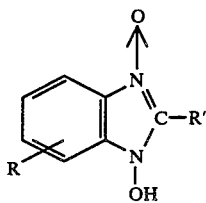
(I)

wherein R is hydrogen, or a halogen, hydroxyl, lower hydrocarbyl, lower hydrocarbyloxy, lower hydrocarbylthio, carboxyl, cyano, amino, amide or —C(O)— lower hydrocarbyl group, and R' is hydrogen, or a lower acyl, lower hydrocarbyl, lower hydrocarbyl amide, carboxamide carboxy acid, carboxy ester, or aryl group. It is preferred that R is in the 5- or 6-position.

In another embodiment the rubber compositions are modified rubber compositions containing a minor, cured property-improving amount of at least one nitrogen- and oxygen-containing composition made by the reaction of a primary nitroalkene (R'CH$_2$NO$_2$), a beta-ketosulfone (e.g., PhSO$_2$C(R')HC(O)Ph) or an alpha-sulfonyl carboxylic ester and carboxamide (e.g., PhSO$_2$CH$_2$R') with a benzofurazan oxide in the presence of an alkali, said benzofurazan oxide being characterized by the formula

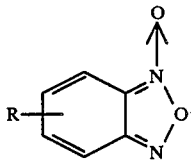
(II)

wherein R is hydrogen, or a halogen, hydroxyl, lower hydrocarbyl, halohydrocarbyl lower hydrocarbyloxy, lower hydrocarbylthio, carboxyl, cyano, amino, amide or —C(O)— lower hydrocarbyl group.

The rubbers in another aspect of this invention are vulcanizates (i.e., cured stocks) prepared by vulcanizing an uncured rubber mixture of the type described above and which includes at least one filler. In addition to fillers of the conventional type such as carbon black and other inorganic, finely divided materials contained in uncured rubbers, the vulcanizates contain conventional curing systems and agents, such as sulfur, antioxidants, accelerators, retarders, coupling agents, promoters and the like.

The rubbers used herein contain carbon-carbon unsaturation in the molecular structure and these rubbers include natural as well as synthetic rubbers. The rubber compositions used in the present invention include natural rubber and rubber-like polymers produced by polymerizing aliphatic, conjugated diolefins, especially those containing 4 to 8 carbon atoms per molecule such as butadiene, isoprene, pentadienes, etc., or the copolymers of such dienes. The rubbers used in the uncured compositions of this invention have unsaturated carbon chains. That is, their polymer backbones contain a significant amount of unsaturation, in contrast to the pendant or vinyl saturation found in some other types of rubbers. Typically, the chains of such unsaturated rubbers have at least about 5% of their carbon-to-carbon bonds as unsaturated bonds. Characterization of rubber as having unsaturated carbon chains is well known in the art as shown by ANSI/ASTM Standard D 1418-79A where unsaturated-chain rubbers are referred to as R rubbers. Class R rubbers include natural rubber and various synthetic rubbers derived at least partly from diolefins. The following is a non-exclusive list of R class rubbers which can be used in the compositions of the present invention:

ABR—Acrylate-butadiene
BR—Butadiene
CIIR—Chloro-isobutene-isoprene
CR—Chloroprene
IR—Isoprene, synthetic
NBR—Nitrile-butadiene
NCR—Nitrile-chloroprene
NIR—Nitrile-isoprene
NR—Natural rubber
SBR—Styrene-butadiene
SCR—Styrene-chloroprene
SIR—Styrene-isoprene rubbers Of these, the NR, IR, BR, SBR or mixtures of two or more of these are typically used. Many compositions are made wherein the rubber is NR, SBR or a mixture containing at least about 50% of one of these. Compositions containing only NR as the rubber portion are often used. In the context of this invention, NR includes both hevea and guayule rubber as well as mixtures thereof.

The rubbers used herein having carbon-carbon unsaturation also may be other than the above-described R rubbers. Examples of such rubbers include EPDM. EPDM rubbers are derived from ethylene-propylenediene monomer and generally about 3–8% of their carbon bonds are unsaturated bonds.

The above rubber compositions can be modified in accordance with the present invention by incorporating into the rubber a minor property-improving amount of at least one hydroxy-benzimidazole oxide compound or the nitrogen- and oxygen-containing reaction products as defined and illustrated more fully below. The amount of these additives incorporated into the unvulcanized rubber composition will generally be an amount which is sufficient to provide desirable properties to the rubber composition in its cured form. Thus, the amount of the benzimidazole and/or nitrogen- and oxygen-containing reaction product incorporated into an uncured formulation will be an amount which will improve the processability of the composition, and in certain instances, its green strength and/or viscosity properties. Processability properties are those related to the ease and efficiency of mixing, mastication and handling of a rubber composition in its unvulcanized, that is, uncured state. Similar amounts used in the cured compositions to improve such vulcanizate properties as filler interaction, hysteresis, rolling loss, running temperature and the like. Typically, this property-improving amount will range from about 0.1 to about 10 parts per 100 parts by weight of rubber (phr). More often, amounts ranging from about 0.5 to 5 phr are included in the rubber compositions.

In one embodiment, the hydroxy-benzimidazole oxides used in both the vulcanizable and vulcanized (cured) rubber compositions of this invention are characterized by the formula

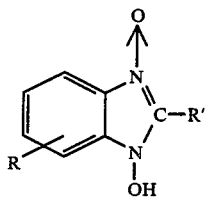

(I)

wherein R is hydrogen, or a halogen, hydroxyl, lower hydrocarbyl, lower hydrocarbyloxy, lower hydrocarbylthio, carboxyl, cyano, amino, amide or —C(O)— lower hydrocarbyl group, and R' is hydrogen, or a lower acyl, lower hydrocarbyl, lower hydrocarbyl amide, carboxamide carboxy acid, carboxy ester, or aryl group. In a preferred embodiment, R is in the 5- or 6-position.

The hydrocarbyl groups R and R' may be alkyl, aryl, alkaryl, aralkyl, etc., and the hydrocarbyloxy groups may be the corresponding alkoxy, aryloxy, etc. groups. More generally, the hydrocarbyl groups are lower alkyl group containing up to about 8 carbon atoms such as methyl, ethyl, n-propyl, isopropyl, n-butyl, isobutyl, pentyl, etc. It is preferred that R is hydrogen, methyl, or methoxy, and in a particularly preferred embodiment, R is hydrogen.

It is preferred that R' is hydrogen or a lower hydrocarbyl as defined above, and generally, R' is a lower hydrocarbyl such as a methyl or ethyl group.

The hydroxy-benzimidazole oxides useful in this invention and represented by Formula I can be prepared by methods known in the art. For example, benzimidazoles can be prepared by the reaction of benzofurazan oxides (II) with a primary nitroalkane, a beta-ketosulfone, an alpha-sulfonyl carboxylic acid ester, or an alpha-sulfonyl carboxamide, said benzofurazan oxide being characterized by the following Formula II

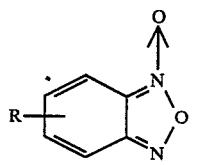

(II)

wherein R is hydrogen, or a halogen, hydroxyl, lower hydrocarbyl, halohydrocarbyl lower hydrocarbyloxy, lower hydrocarbylthio, carboxyl, cyano, amino, amide or —C(O)— lower hydrocarbyl group. Such reactions are described in the literature and are reported to form 1-hydroxy benzimidazole 3-oxides and possibly minor amounts of other nitrogen- and oxygen-containing materials. Compositions comprising such reaction products including the 1-hydroxy-benzimidizole 3-oxides of Formula I are useful by modifying the rubbers in accordance with the process of the present invention. For convenience, the reaction of the benzofurazan oxide with a primary nitroalkane, a beta-ketosulfone, or an alpha-sulfonyl carboxylic acid ester or carboxamide is represented below as forming the 1-hydroxy-benzimidazole 3-oxide.

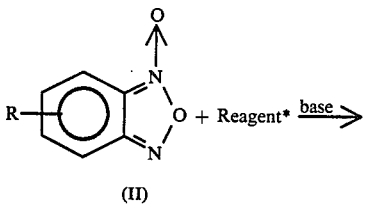

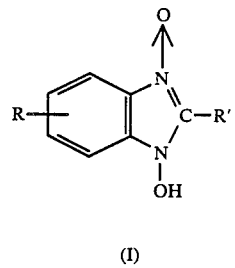

(I)

Reagent*

R'CH$_2$NO$_2$; R'=H, hydrocarbyl, hydrocarbyl amide, carboxy ester; or

PhSO$_2$C(R')HC(O)Ph; R'=H, hydrocarbyl; or

PhSO$_2$CH$_2$R'; R'=carboxamide, carboxy ester.

The reactions are conducted in the presence of a base.

The procedure for preparing 1-hydroxy-1-H-benzimidazole 3-oxides by the reaction of about equimolar amount of benzofurazan oxide with primary nitroalkanes such as represented by the formula

R'CH$_2$NO$_2$ in tetrahydrofuran in the presence of organic amine bases at temperatures of from about ambient temperature up to about 50°-60° C. is described in the literature such as, for example, J. Org. Chem., Vol. 37, No. 15, 1972, pp. 2519–2520, and A. Gasco and A. J. Boulton, *Advances in Heterocyclic Chemistry*, Vol. 29, pp. 310–311, Academic Press 1981. The contents of these publications are hereby incorporated by reference for their disclosures of the preparation of 1-hydroxy-benzimidazole oxides useful in the present invention.

Briefly, benzofurazan oxide reacts exothermically with primary nitroalkanes in tetrahydrofuran and in presence of organic amine bases to form the desired 2-substituted 1-hydroxy-benzimidazole 3-oxides and nitrite salts of the amines. For example, if diethylamine is used as the base, the by-product is the nitrite of diethylamine.

In the typical procedure, 0.1 mole of benzofurazan 1-oxide and 0.12 mole of nitroethane is dissolved at 100 ml. of tetrahydrofuran. To this mixture there is added at room temperature, 0.12 mole of diethylamine over a period of 0.5 hour. An instantaneous exothermic reaction is observed (40° C.) and within one hour, the product crystallizes from the solution. The solution is allowed to stand overnight at room temperature and filtered to yield 9.6 grams of 2-methyl-1-hydroxy-1-H- benzimidazole 3-oxide (Table I, Example 2). The product can be rectystallized from methanol.

The preparation of hydroxy-benzimidazole 3-oxides useful in the present invention by reaction of about equimolar amounts of benzofurazan oxide with beta-ketosulfones alpha-sulfonyl carboxamides, and alpha-sulfonyl carboxylic esters in an alkaline medium at temperatures of from ambient temperature to about 50°–60° C. is described in J. Org. Chem., Vol. 37, No. 15, 1972, pp. 2372–2376, and A. Gasco and A. J. Boulton, *Advances in Heterocyclic Chemistry*, Vol. 29. pp. 310–311, Academic Press 1981. The contents of the references are hereby incorporated for the disclosure of the preparation of various benzimidazole oxides useful in the present invention.

Examples of beta-ketosulfones which can be reacted with benzofurazan oxides in alkaline media include 2-benzene sulfonyl acetophenone, and 2-alkyl-2-benzene sulfonyl acetophenones wherein the alkyl group is, for example, a lower hydrocarbyl group such as methyl, ethyl, butyl, etc. Examples of alpha-sulfonyl carboxamides which can be reacted with furazan oxides include 2-benzene sulfonyl acetamides wherein R' may be —C(O)NH$_2$; —C(O)NHPh; —C(O)N(Et)2; —C(O)N(i-Pr)2; —C(O)NCH$_3$Ph; —C(O)OH; and —C(O)OEt. The base utilized to promote the reaction generally is an alkali metal hydroxide such as sodium or potassium hydroxide dissolved in an alcohol such as methanol or ethanol. An example of an alpha-sulfonyl carboxylic ester which can be reacted with benzofurazan oxides is ethyl 2-benzene sulfonyl acetate.

The general procedure for the reaction of benzofurazan oxide with beta-carbonyl sulfones is as follows: A mixture of 0.02 mole of the beta-carbonyl sulfone, 5.44 grams (0.04 mole) of benzofurazan oxide and 50 ml. of methanol is prepared and crystals are dissolved by warming the mixture. An 8% methanolic KOH solution (50 ml.) is added and the mixture maintained at room temperature for 12 hours. The reaction mixture is filtered, and the filtrate is evaporated to dryness whereupon 15 ml. of water is added to the residue. Stirring and cooling results in the crystallization of potassium salt by-products, and the mixture is filtered. This filtrate is neutralized with concentrated hydrochloric acid until a few droplets of oil are formed. The oil is extracted with ether and the aqueous layer separated and neutralized further with concentrated hydrochloric acid to form an oily precipitate. The precipitate is triturated with acetone to give fairly pure crystals of the 1-hydroxy-3-oxobenzimidazole derivatives. The products are soluble in acidic and basic media and insoluble in acetone. The products can be recrystallized from methanol, ethanol, and/or water.

When 2-alkyl-2-benzene sulfonyl acetophenones are reacted with a benzofurazan oxide, when the reaction mixture is warmed to 40°–60° C. for 8 hours and then worked up as described above. The reaction mixture is prepared utilizing 2-benzene sulfonyl acetamide (R'=CONH$_2$) is warmed for 30 minutes and then worked up as described above.

The reaction mixture of benzofurazan oxide with ethyl 2-benzene sulfonyl acetate is warmed to 50° C. for 3 hours, and the resulting 1-hydroxy-3-oxobenzimidazole-2-carboxylic acid is recrystallized by dissolving it several times in 1% KOH solution and neutralizing with hydrochloric acid.

Compounds corresponding to Formula I wherein R' is an aryl group, and more specifically where R' is a phenyl group can be prepared from nitroso and nitrile oxide compounds as described in Houben Weyl, *Methoden der Organischen Chemie*, vol. X/III, page 868.

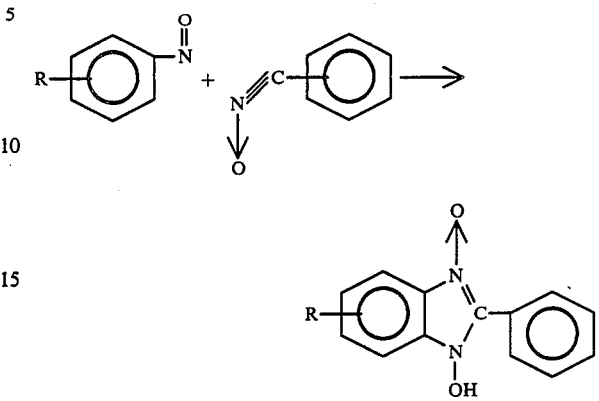

The rubber compositions also can be modified in accordance with one embodiment of this invention by including in the rubber, a property-improving amount of the product or product mixture obtained in the above described reaction of benzofurazan oxides (II) with the above-described reagents. Although preferred, it is not essential that the products identified as (I) above be isolated from the remainder of the reaction products.

Specific examples of 1-hydroxy-benzimidazole 3-oxides which can be used to modify rubber compositions in accordance with this invention are illustrated in the following Table I.

TABLE I

1-Hydroxybenzimidazole 3-Oxides

| Example | R | R' |
|---|---|---|
| 1 | H | —H |
| 2 | H | —CH$_3$ |
| 3 | H | —CH$_2$CH$_3$ |
| 4 | H | —CH$_2$CH$_2$CONH$_2$ |
| 5 | H | —CO$_2$CH$_2$CH$_3$ |
| 6 | H | —CH$_2$CH$_2$CH$_2$CH$_3$ |
| 7 | H | —CONH$_2$ |
| 8 | H | —CON(C$_2$H$_5$)$_2$ |
| 9 | H | —CON(iPr)$_2$ |
| 10 | H | —COOEt |
| 11 | H | —C(O)N(CH$_3$)Ph |
| 12 | H | —C(O)NHPh |
| 13 | H | —C$_6$H$_5$ |
| 14 | H | —⟨(H)⟩ |

EXAMPLES 13–24

These compounds are similar to Examples 1–12 except R is —CH$_3$ in lieu of H.

The vulcanizable compositions of the present invention comprising at least one rubber and at least one 1-hydroxy-benzimidazole oxide compound and/or the above-described nitrogen- and oxygen-containing compositions can be prepared by conventional techniques using various types of mills, blenders and mixers known to the art. The temperatures used in formulating the rubber compositions of this invention range from ambient to those normally used in the art such as 75° to 175° or 220° C.

Specifically, devices such as well-known Brabender and Banbury mixers can be used to mechanically compound the rubber and the 1-hydroxy-benzimidazole oxides or nitrogen- and oxygen-containing reaction products described above together with any fillers such as carbon black, and other materials generally used in conventional rubber formulations such as antioxidants, retarders, etc. as mentioned above. To achieve the improved properties, the vulcanizable mixtures of the present invention are compounded at temperatures of about 95° to 205° C. (200°–400° F.), typically, about 160°–200° C. (325°–390° F.) for a period of from about 2 to about 20 minutes, generally from about 3 to about 15 minutes. For example, when a conventional size Banbury mixer is used, the apparatus is operated at a rotor speed of about 50 to about 150 rpm. while a laboratory 65 cc. Brabender apparatus is operated at a mixing speed of about 60–100 rpm. Such devices can be equipped with thermocouples and water jackets to monitor and control mixing batch temperature. Finishing steps can be carried out on conventional equipment such as open mills using conditions and techniques known to the art. Similarly, tread components for pneumatic tires can be prepared by conventional procedures.

In some instances, it is convenient to combine the 1-hydroxy-benzimidazole oxide with an inert material which serves as a carrier and de-sensitizer. Organic materials such as methyl stearate, petroleum wax, viscous mineral oils as well as inorganic and mixed materials such as clay, zinc stearate, diatomaceous earth and the like can be used for this purpose. Such combinations usually contain about 25–95% of the 1-hydroxy-benzimidazole oxide with the balance being one or more of the inert materials.

In addition to the 1-hydroxy-benzimidazole oxides or nitrogen- and oxygen-containing reaction products, the uncured rubber compositions of this invention also may contain materials used in conventional rubber formulations such as antioxidants, retarders, promoters, fillers, etc. In the uncured or unvulcanized rubber compositions of the invention, the compositions do not contain curing agents, either because they are intermediate compositions to which a curing system will be, but not yet has been, added or because they are to be put in use without the addition of curing agents in such applications as sealants, caulks, adhesives, etc.

As mentioned above, fillers may be and often are present in the uncured rubber compositions of the present invention. Typical fillers include carbon black in its various forms, glass, silica, talc, and similarly finely divided mineral materials. The amount of reinforcing filler incorporated into the rubber compositions of the present invention may be varied over a wide range although the mixture generally will contain from about 30 to 100 parts of filler per 100 parts of rubber.

Carbon black fillers generally are included in the rubber compositions of this invention, especially in the vulcanizates, and they include any of the commonly available, commercially-produced carbon blacks. Those having a surface area (EMSA) of at least 20 m²/g. and more preferably at least 35 m²/g. up to 200 m²/g. or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the rubber compositions of the invention. Typical values for surface areas of usable carbon blacks are summarized in the following Table II.

TABLE II

| Carbon Blacks | |
|---|---|
| ASTM Designation (D-1765-82a) | Surface Area (m²/g) (D-3765) |
| N-110 | 126 |
| N-220 | 111 |
| N-339 | 95 |
| N-330 | 83 |
| N-550 | 42 |
| N-660 | 35 |

The carbon blacks utilized in the invention may be in pelletized form or an unpelletized flocculant mass. Preferably, for more uniform mixing, unpelletized carbon black is preferred. Similar silic reinforcing agents having comparable particle sizes and thus surface areas can also be used.

The following examples illustrate the preparation of the modified uncured rubber compositions of the present invention. Unless otherwise indicated in the examples or elsewhere in the application, all parts and percentages are by weight, and the temperatures are in degrees centigrade. In the following examples, solution SBR-1 is an SBR in 37.5 phr aromatic oil further characterized as containing 25% bound styrene and 2.5% max. block styrene, with a Mooney Viscosity: Large Rotor/4 at 212° F. of 45±5.

Unless otherwise indicated, an internal mixer, such as a Brabender or small size Banbury mixer is used to prepare the uncured rubber formulations. The usual technique is to add various parts of the composition to the mixer, continuing the mixing for the indicated period of time, and then making further additions. The standard technique is according to the following procedure.

| Time | Add to Mixer |
|---|---|
| 0 | Polymer, 100 parts; preheat to 170° C. Half charge filler plus 1-hydroxy benzimidazole 3-oxide |
| 1.5 | Balance of filler, zinc oxide and stearic acid |
| 3.0 | Processing oil |
| 6.0 | Drop mixed compositions at 160–170° C. (320–340° F.) |

Masterbatches prepared essentially according to this schedule can be combined with the conventional elastomer curing systems described in the following examples in typical amounts and cured for 15–30 minutes at about 150° C. to provide test specimens.

TABLE III

| UNCURED RUBBER FORMULATIONS | | | |
|---|---|---|---|
| Example/pbw | Control | A | B |
| Solution SBR-1 | 137.5 | 137.5 | 137.5 |
| Carbon Black (N339) | 63 | 63 | 63 |
| ZnO | 5 | 5 | 5 |
| Stearic Acid | 1.5 | 1.5 | 1.5 |
| Product of Ex. 2 | — | 1.0 | — |
| Product of Ex. 3 | — | — | 1.0 |

As mentioned above, the uncured modified rubber compositions of the invention are useful in the preparation of filled vulcanizates which are useful in a number of applications. Thus, the uncured modified rubber compositions of the present invention generally are formulated with conventional rubber additives to form masterbatches (as in Examples A and B above) which can then be cured by the addition of curing agents, accelerators, etc. When the uncured modified rubber compositions of the present invention are prepared in the absence of carbon black, carbon black is added to the masterbatch formulation. Alternatively, when a reinforcing filler such as carbon black is included in the mixture used in the preparation of the uncured modified polymer rubber compositions of the invention the addition of carbon black to the masterbatch formulation may be unnecessary if sufficient carbon black was included in the initial mixture. If less than the desired amount of carbon black is included in the initial mixture, then additional carbon black must be added to the masterbatch. The total amount of carbon black included will range from about 20 to 100 phr.

The vulcanizable compositions (including masterbatches) containing the modified rubbers of the present invention can be prepared by conventional techniques and using various types of mills, blenders and mixers known in the art.

The curing agents used to prepare the vulcanizates may be conventional types such as sulfur- or peroxide-based curing systems. They are used in conventional amounts and incorporated in the uncured compositions of the invention by known techniques and procedures. The vulcanizates of this invention are prepared by curing these compositions under conditions of temperature and time customarily used in the art. Typically, the rubber, 1-hydroxy-benzimidazole oxide or nitrogen- and oxygen-containing compositions described herein, carbon black, other fillers and normal processing aids such as zinc oxide, stearic acid and processing oil are mixed, the sulfur and accelerators are then added, and the mixture is cured. Other mixing sequences can be used, but it is preferred to have the rubber, 1-hydroxy-benzimidazole oxide or reaction product, and carbon black composition intimately combined before vulcanizing agents are added.

Among the desirable and beneficial properties exhibited by the vulcanized rubber compositions of the present invention prepared with the modified rubber compositions described herein are an increase in rebound, reduced low strain hysteresis, higher electrical resistivity and when utilized in treads of tires, a decrease in the rolling loss and running temperature.

The following examples illustrate the preparation of vulcanized rubber compositions in accordance with the invention utilizing the 1-hydroxy-benzimidazole oxide modified rubbers of the invention. Conventional rubber compounding materials, conditions, temperatures, procedures and evaluation techniques are used unless noted to the contrary.

EXAMPLE C

Passenger tire tread vulcanizates are prepared from a solution SBR according to a tread stock recipe containing 137.5 parts of SBR-1, 63 phr of carbon black (N339), 5 phr of ZnO, 1.5 phr of stearic acid, 1.8 phr of sulfur, 1.0 phr of Santocure NS, and 1.0 phr of the 1-hydroxy-benzimidazole 3-oxide product of Example 2. A control stock is also prepared containing no 1-hydroxybenzimidazole oxide. The formulations are prepared and mixed at about 350° F. and thereafter cured in the usual manner. The vulcanizate specimens evaluated in a number of standard tests. The results of the tests are summarized in Table IV.

TABLE IV

| | Example: | |
|---|---|---|
| | Control | C |
| % Rebound | | |
| 73° F. | 46 | 52 |
| 150° F. | 60 | 62 |
| MTS 7% def. 10 lb. 10 HZ | | |
| K' (73° F.) | 770 | 680 |
| K" (73° F.) | 147 | 108 |
| Tan delta | 0.191 | 0.159 |
| % delta change | par | −17 |

As can be seen, the use of the 1-hydroxybenzimidazole 3-oxide in Example C results in an increase in rebound and a 15% reduction in tan delta.

The vulcanizable and vulcanized rubber compositions of the invention resulting from the use of the rubbers modified in accordance with this invention can be molded or shaped into the desired shapes by known techniques, and they can be used for many purposes for which similar compositions are used. The vulcanized rubber compositions of the invention exhibit improved mechanical properties such as reduced hysteresis (Tan delta and rebound), and when the rubbers of the invention are utilized in the preparation of treads for tires, the tires are characterized by a reduction in rolling loss. The entire tire may be constructed of the SBR vulcanizates of the invention or other portions in addition to the treads may be constructed using the vulcanizates of the invention.

In the practice of this invention, the tread can be applied during the building of the green tire in which an uncured, shaped tread of the formulation of the present invention is built onto the carcass following which the green tire is shaped and cured. Alternatively, the tread can be applied to a cured tire carcass from which the previous tread has been buffed or abraded away and the uncured, shaped tread of the present invention cured thereon as a retread.

While the invention has been described and exemplified herein by reference to specific examples, machinery, techniques, procedures and examples, it is understood that it not restricted to any of these, and numerous variations, combinations and permutations can be made within the scope of the invention as is clear to those skilled in the art.

We claim:

1. A rubber composition comprising at least one rubber having an unsaturated carbon chain and a minor property-improving amount of at least one 1-hydroxybenzimidazole 3-oxide compound of the formula

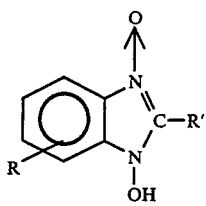

wherein R is hydrogen, or a, hydroxyl, lower acyl, lower hydrocarbyl, lower hydrocarbyloxy, lower hydrocarbylthio, carboxyl, cyano, amino, amide or —C(O)— lower hydrocarbyl group, and R' is hydrogen, or a lower hydrocarbyl, lower hydrocarbyl amide, carboxamide carboxy acid, carboxy ester, or aryl group.

2. The rubber composition of claim 1 wherein the rubber is NR, IR, BR, SBR, CR, CIIR, NIR or a mixture of two or more of said rubbers.

3. The rubber composition of claim 1 wherein the rubber is NR, SBR or a mixture containing at least about 50% of one of these, and R' is methyl.

4. The rubber composition of claim 1 wherein R is hydrogen, methyl, or methoxy.

5. The rubber composition of claim 1 wherein the rubber is an uncured or vulcanized rubber composition.

6. The rubber composition of claim 1 wherein R' is hydrogen or a lower alkyl group.

7. The rubber composition of claim 1 wherein R is hydrogen and R' is methyl or phenyl.

8. The rubber composition of claim 1 also containing at least one reinforcing filler.

9. The rubber composition of claim 1 also containing at least one carbon black filler.

10. A rubber composition comprising at least one rubber having an unsaturated carbon chain and a minor property-improving amount of at least one nitrogen- and oxygen-containing composition obtained by the reaction of a primary nitroalkane, a beta-ketosulfone, an alpha-sulfonyl carboxylic ester, an alpha-sulfonyl carboxamide with a benzofurazan oxide in the presence of an alkali, said benzofurazan oxide being characterized by the formula

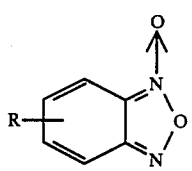

wherein R is hydrogen, or a, hydroxyl, lower acyl, lower hydrocarbyl, halohydrocarbyl lower hydrocarbyloxy, lower hydrocarbylthio, carboxyl, cyano, amino, amide or —C(O)— lower hydrocarbyl group.

11. The rubber composition of claim 10 wherein the rubber is NR, IR, BR, SBR, CR, CIIR, NIR or a mixture of two or more of said rubbers.

12. The rubber composition of claim 10 wherein the rubber is NR, SBR or a mixture containing at least about 50% of one of these.

13. The rubber of claim 10 wherein the rubber composition is an uncured or vulcanized rubber composition.

14. The rubber composition of claim 10 wherein R is hydrogen, methyl, or methoxy.

15. The rubber composition of claim 10 wherein the primary nitroalkane of the formula

R'CH$_2$NO$_2$ wherein R' is hydrogen or a lower alkyl, hydrocarbyl amide or carboxylic ester group.

16. The rubber composition of claim 10 wherein the beta-ketosulfonyl group is of the formula PhSO$_2$CR'HC(O)Ph wherein R' is hydrogen or a lower hydrocarbyl group, and the alpha-sulfonyl carboxylic acid ester and carboxamide are of the formula PhSO$_2$CH$_2$R' wherein R' is an amide, substituted amide, a carboxylic acid or carboxylic ester.

17. The rubber composition of claim 10 also containing at least one reinforcing filler.

18. The rubber composition of claim 11 also containing at least one carbon black filler.

19. A filled vulcanizate of a rubber composition comprising at least one rubber having an unsaturated carbon chain, a minor property-improving amount of at least one 1-hydroxy-benzimidazole-3-oxide compound of the formula

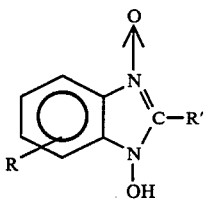

wherein R is hydrogen, or a halogen, hydroxyl, lower acyl, lower hydrocarbyl, lower hydrocarbyloxy, lower hydrocarbylthio, carboxyl, cyano, amino, amide or —C(O)— lower hydrocarbyl group, and R' is hydrogen, or a lower hydrocarbyl, lower hydrocarbyl amide, carboxamide carboxy acid, carboxy ester, or aryl group and at least one filler.

20. The vulcanizate of claim 19 wherein the rubber is NR, SBR or a mixture containing at least about 50% SBR, and the filler is carbon black, silica or a mixture of these.

21. The vulcanizate of claim 19 wherein the filler is at least one reinforcing carbon black.

22. The vulcanizate of claim 19 wherein R' is methyl.

23. The vulcanizate of claim 19 wherein R is hydrogen and R' is methyl.

24. The rubber composition of claim 10 wherein the rubber composition is a filled vulcanizate containing at least one filler.

25. The filled vulcanizate of claim 24 wherein the filler is at least one carbon black.

26. A rubber composition comprising at least one rubber having an unsaturated carbon chain and from about 0.01 to about 5 parts by weight phr of at least one 1-hydroxybenzimidazole 3-oxide compound of the formula

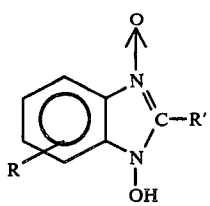

(I)

wherein R is hydrogen, or a halogen, hydroxyl, lower acyl, lower hydrocarbyl, lower hydrocarbyloxy, lower hydrocarbylthio, carboxyl, cyano, amino, amide or —C(O)— lower hydrocarbyl group, and R' is hydrogen, or a lower hydrocarbyl, lower hydrocarbyl amide, carboxamide carboxy acid, carboxy ester, or aryl group.

27. A rubber composition comprising at least one rubber having an unsaturated carbon chain and from about 0.01 to about 5 parts by weight phr of at least one nitrogen- and oxygen-containing composition obtained by the reaction of a primary nitroalkane, a beta-ketosulfone, an alpha-sulfonyl carboxylic ester, an alpha-sulfonyl carboxamide with a benzofurazan oxide in the presence of an alkali, said benzofurazan oxide being characterized by the formula

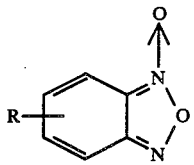

(II)

wherein R is hydrogen, or a halogen, hydroxyl, lower acyl, lower hydrocarbyl, halohydrocarbyl lower hydrocarbyloxy, lower hydrocarbylthio, carboxyl, cyano, amino, amide or —C(O)— lower hydrocarbyl group.

28. The vulcanizate of claim 19 wherein the rubber composition contains from about 0.01 to about 5 parts by weight phr of the benzimidazole-3-oxide compound.

* * * * *